US011980222B2

(12) United States Patent
Liu et al.

(10) Patent No.: US 11,980,222 B2
(45) Date of Patent: May 14, 2024

(54) ULTRASONIC ATOMIZATION SHEET AND ATOMIZER AND ULTRASONIC ELECTRONIC CIGARETTE

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Xinqiang Yin, Hunan (CN); Jianhua Yi, Hunan (CN); Yecheng Kuang, Hunan (CN); Yongquan Zhou, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 506 days.

(21) Appl. No.: 17/278,231

(22) PCT Filed: Sep. 20, 2019

(86) PCT No.: PCT/CN2019/106978

§ 371 (c)(1),
(2) Date: Mar. 19, 2021

(87) PCT Pub. No.: WO2020/057636

PCT Pub. Date: Mar. 26, 2020

(65) Prior Publication Data

US 2021/0345664 A1 Nov. 11, 2021

(30) Foreign Application Priority Data

Sep. 21, 2018 (CN) ......................... 201811107774.9
Sep. 21, 2018 (CN) ......................... 201811107789.5

(Continued)

(51) Int. Cl.

*A24F 40/05* (2020.01)
*A24F 40/10* (2020.01)
*A24F 40/485* (2020.01)
*A24F 40/70* (2020.01)
*B05B 17/06* (2006.01)

(52) U.S. Cl.

CPC .............. *A24F 40/05* (2020.01); *A24F 40/10* (2020.01); *A24F 40/485* (2020.01); *A24F 40/70* (2020.01); *B05B 17/0653* (2013.01)

(58) Field of Classification Search

CPC ........ A24F 40/05; A24F 40/70; A24F 40/485; A24F 40/10; B05B 17/0653

See application file for complete search history.

(56) References Cited

U.S. PATENT DOCUMENTS 10,531,687 B2 * 1/2020 Liu ......................... A24F 40/05
2017/0173621 A1 * 6/2017 Yang ......................... B05B 3/14

FOREIGN PATENT DOCUMENTS

CN 2782225 Y 5/2006
CN 2827552 Y 10/2006

(Continued)

OTHER PUBLICATIONS

International Search Report issued in International Application No. PCT/CN2019/106978 dated Dec. 20, 2019, 3 pages.

*Primary Examiner* — Gary F Paumen

(74) *Attorney, Agent, or Firm* — MASCHOFF BRENNAN; Ran Pang; Michael Mauriel

(57) ABSTRACT

An ultrasonic atomization sheet (1) and atomizer and an ultrasonic electronic cigarette are disclosed. The ultrasonic atomization sheet (1) comprises a flaky piezoelectric substrate (101), a surface electrode (102) attached to one surface of the piezoelectric substrate (101), and a drive electrode (103) attached to the other surface of the piezoelectric substrate (101). The piezoelectric substrate (101) is elongated. The piezoelectric substrate (101) is composed of an (Continued)

oscillating section (106) and a fixed section (107) connected to each other. The surface electrode (102) is fixed on one surface of the oscillating section (106), and the drive electrode (103) is fixed on the other surface of the oscillating section (106). The surface electrode (102) and the drive electrode (103) are both rectangular or circular.

20 Claims, 19 Drawing Sheets

(30) Foreign Application Priority Data

Sep. 21, 2018 (CN) ......................... 201811108690.7
Sep. 21, 2018 (CN) ......................... 201821554434.6

(56) References Cited

FOREIGN PATENT DOCUMENTS

| | | | |
|---|---|---|---|
| CN | 2915280 | Y | 6/2007 |
| CN | 101015823 | A | 8/2007 |
| CN | 205624490 | U | 10/2016 |
| CN | 206240711 | U | 6/2017 |
| CN | 208909134 | U | 5/2019 |
| CN | 208909135 | U | 5/2019 |
| CN | 208941054 | U | 6/2019 |
| CN | 209002936 | U | 6/2019 |
| WO | 2016/127360 | A1 | 8/2016 |

* cited by examiner

ULTRASONIC ATOMIZATION SHEET AND ATOMIZER AND ULTRASONIC ELECTRONIC CIGARETTE

CROSS REFERENCE TO RELATED APPLICATIONS

This application is a U.S. National Phase application under 35 U.S.C. § 371 of International Application No. PCT/CN2019/106978 filed on Sep. 20, 2019, which claims priority to Chinese Application No. 201811107774.9 filed on Sep. 21, 2018, Chinese Application No. 201821554434.6 filed on Sep. 21, 2018, Chinese Application No. 201811107789.5 filed on Sep. 21, 2018, and Chinese Application No. 201811108690.7 filed on Sep. 21, 2018. The entire contents of these applications are hereby incorporated herein by reference.

FIELD OF THE INVENTION

The present invention particularly relates to an ultrasonic atomization sheet and atomizer and an ultrasonic electronic cigarette.

BACKGROUND OF THE INVENTION

The existing ultrasonic electronic cigarette comprises a shell. An ultrasonic atomization sheet, an e-liquid guide mechanism and an e-liquid compartment are arranged in the shell. The e-liquid compartment is connected to an atomization surface of the ultrasonic atomization sheet through the e-liquid guide mechanism. E-liquid or other smoking material in the e-liquid compartment is guided to the atomization surface of the ultrasonic atomization sheet by the e-liquid guide mechanism, and the e-liquid or other smoking material generates smoke under the high-frequency atomization effect of the ultrasonic atomization sheet for users to smoke.

In the existing ultrasonic electronic cigarette, the ultrasonic atomization sheet is in the shape of a disc, and comprises a disc-shaped piezoelectric substrate, a surface electrode fixed on one surface of the piezoelectric substrate, and a drive electrode fixed on the other surface of the piezoelectric substrate. When working, the surface electrode and the drive electrode are respectively connected to two poles of a power source, and the ultrasonic atomization sheet can work for high-frequency atomization.

Since the disc-shaped ultrasonic atomization sheet needs to be fixed with a cylindrical fixing sleeve, and the fixing sleeve surrounds and fixes the ultrasonic atomization sheet along the circumference of the ultrasonic atomization sheet, the circumference of the ultrasonic atomization sheet is fixed, which limits the high-frequency working amplitude of the ultrasonic atomization sheet, affects the atomization effect, and the amount of smoke is small. In addition, since the atomization effect of the disc-shaped ultrasonic atomization sheet is relatively poor, in order to improve the atomization effect, the diameter of the ultrasonic atomization sheet is generally large, which leads to a large size of the ultrasonic electronic cigarette.

SUMMARY OF THE INVENTION

In view of the above shortcomings of the prior art, the purpose of the present invention is to provide an ultrasonic atomization sheet and atomizer and an ultrasonic electronic cigarette, which have good atomization effect, produce a large amount of smoke, and have small sizes.

In order to solve the above technical problems, the technical solution adopted by the present invention is as follows:

An ultrasonic atomization sheet comprises a flaky piezoelectric substrate, a surface electrode attached to one surface of the piezoelectric substrate, and a drive electrode attached to the other surface of the piezoelectric substrate, wherein the structural characteristics of the ultrasonic atomization sheet are that the piezoelectric substrate is elongated.

With the above structure, since the piezoelectric substrate is elongated, an elongated ultrasonic atomization sheet is formed. There are two ways to assemble the ultrasonic atomization sheet. In the first way, when assembling, one section of the ultrasonic atomization sheet is clamped and fixed with a holder, and the other section of the ultrasonic atomization sheet is a free section. During the oscillation process, because one section of the ultrasonic atomization sheet is clamped and fixed by the holder, the amplitude of this section is relatively weak. The other section of the ultrasonic atomization sheet is a free section without any restriction, so the amplitude is relatively large, the atomization effect is good, and the amount of smoke is large. In the second way, the middle region of the ultrasonic atomization sheet is clamped and fixed with the holder, so that both ends of the ultrasonic atomization sheet are in a free state. In the second way, both ends of the ultrasonic atomization sheet can be used to ultrasonically atomize a smoking material, and the amplitudes at both ends are the largest, so the atomization effect is good, and the amount of smoke is increased; in addition, two ends of the ultrasonic atomization sheet can be used to atomize smoking materials with different tastes, and finally two different tastes of smoke are mixed to meet users' pursuit for different tastes of smoke, thereby improving user experience.

It can be seen that due to the good atomization effect of the ultrasonic atomization sheet in the present invention, a smaller ultrasonic atomization sheet can achieve a large amount of smoke, so the size of the ultrasonic atomization sheet is relatively small, which is beneficial to the development of products using the ultrasonic atomization sheet towards miniaturization.

As a preferred mode, the piezoelectric substrate is composed of an oscillating section and a fixed section connected to each other, the surface electrode is fixed on one surface of the oscillating section, and the drive electrode is fixed on the other surface of the oscillating section.

With the above structure, since the piezoelectric substrate is elongated, an elongated ultrasonic atomization sheet is formed. As the ultrasonic atomization sheet is composed of a fixed section and an oscillating section, when the ultrasonic atomization sheet is used, the fixed section of the ultrasonic atomization sheet is clamped and fixed with the holder, and the fixed section supports the oscillating section, making the oscillating section of the ultrasonic atomization sheet to be free in an atomizer. During the oscillation process, because the fixed section is clamped and fixed by the holder, the amplitude of the fixed section is relatively weak. The oscillating section of the ultrasonic atomization sheet is a free section without any restriction, so the amplitude is relatively large, the atomization effect is good, and the amount of smoke is large. Since the ultrasonic atomization sheet in the present invention is elongated, the size of the atomizer using the ultrasonic atomization sheet can be relatively small under the condition that the contact area between the ultrasonic atomization sheet and the smoking material is the same, that is, under the condition that the amount of smoke produced by atomization is the same, which is beneficial to the development of products using the ultrasonic atomization sheet towards miniaturization.

As a preferred mode, the surface electrode and the drive electrode are both rectangular; or, the surface electrode and the drive electrode are both circular. Accordingly, the corresponding areas of two electrodes are large, where an electrical potential difference is produced between the corresponding areas of two electrodes after the two electrodes are energized. As a result, the oscillation area and oscillation intensity of the oscillating section can be increased in the elongated ultrasonic atomization sheet, so that the atomization effect of the ultrasonic atomization sheet can be improved.

As a preferred mode, one surface of the piezoelectric substrate is fully covered by the surface electrode, the central region of the other surface of the piezoelectric substrate is covered by the drive electrode, and the area ratio of the surface electrode to the drive electrode is a:b, where a is larger than b.

With the above structure, the atomization area is large, the amount of smoke is large, and the atomization effect is good.

As a preferred mode, one surface of the oscillating section is fully covered by the surface electrode, the central region of the other surface of the oscillating section is covered by the drive electrode, and the area ratio of the surface electrode to the drive electrode is a:b, where a is larger than b.

As another preferred mode, one surface of the oscillating section is composed of an attachment region fixed with the surface electrode and an exposed region not fixed with the surface electrode, the attachment region and the exposed region are arranged along the length direction of the oscillating section, and the attachment region is closer to the fixed section than the exposed region; and the area ratio of the surface electrode to the drive electrode is a:b, where a is larger than b.

With the above structure, the surface electrode is provided at a distance from an end of the oscillating section, so that the heat generated by the ultrasonic atomization sheet during the atomization process can be diffused to both ends to achieve fast heat dissipation and better oscillation effect, the oscillating section is prevented from being broken due to high temperature, and the service life of the ultrasonic atomization sheet is prolonged.

As a preferred mode, the piezoelectric substrate is further provided with a first welding spot connected with the surface electrode and a second welding spot connected with the drive electrode.

Two poles of a power source are respectively connected to the first welding spot and the second welding spot to realize electrical connection between the two poles of the power source and the surface electrode and the drive electrode.

As a preferred mode, the first welding spot is arranged at an outer edge of the surface electrode, and the second welding spot is arranged at an outer edge of the drive electrode.

With the above structure, the first welding spot is directly arranged next to the surface electrode, and the second welding spot is directly arranged next to the drive electrode, thereby avoiding the use of conductive leads to connect the welding spots and the electrodes and reducing the cost.

As another preferred mode, the first welding spot and the second welding spot are both arranged on an outer surface of the fixed section, a first conductive lead connecting the first welding spot with the surface electrode is fixed on the piezoelectric substrate, and a second conductive lead connecting the second welding spot with the drive electrode is fixed on the piezoelectric substrate.

With the above structure, the first welding spot and the second welding spot are arranged on the fixed section with small amplitude, which prevents the first welding spot and the second welding spot from being pulled off when the ultrasonic atomization sheet oscillates, thereby ensuring the reliability of conduction and the working reliability of the ultrasonic atomization sheet. In addition, the first welding spot and the second welding spot are arranged on the fixed section, which can also avoid the production of high temperature during welding to affect the performance of the oscillating section, thereby prolonging the service life of the ultrasonic atomization sheet.

As a preferred mode, the shape of the first conductive lead is an isosceles trapezoid, a large end of the first conductive lead is connected to the surface electrode in a smooth transition manner, and a small end of the first conductive lead is connected to the first welding spot in a smooth transition manner; the shape of the second conductive lead is an isosceles trapezoid, a large end of the second conductive lead is connected to the drive electrode in a smooth transition manner, and a small end of the second conductive lead is connected to the second welding spot in a smooth transition manner.

With the above structure, there are no sharp corners at the transition connection positions between the first conductive lead and the surface electrode and between the second conductive lead and the drive electrode, which facilitates processing, achieves more stable adhesion, and reduces stress concentration during the polarization of the ultrasonic atomization sheet, with long service life.

As a preferred mode, the surface electrode and the drive electrode are both circular; and an outer end of the oscillating section and/or the fixed section is an arc surface.

With the above structure, when the outer end is an arc surface, the processing is more convenient. If the outer ends of the oscillating section and the fixed section are arc surfaces, the oscillating section and the fixed section do not need to be specially distinguished when processing the covering electrodes, which saves production time and cost.

Based on the same inventive concept, the present invention further provides an ultrasonic atomizer, comprising a shell in which a holder is arranged, wherein the structural characteristics of the ultrasonic atomizer are that the ultrasonic atomization sheet is further arranged in the shell, the holder is fixed in a middle region between two side walls of the ultrasonic atomization sheet, so that both ends of the ultrasonic atomization sheet are in a free state.

Both ends of the ultrasonic atomization sheet are in the free state, so both ends of the ultrasonic atomization sheet can be used for ultrasonic atomization of smoking materials; because the amplitudes of both ends are the largest, the atomization effect is good, and the amount of smoke is increased; and two ends of the ultrasonic atomization sheet can be used to atomize smoking materials with different tastes, and finally two different tastes of smoke are mixed to meet users' pursuit for different tastes of smoke, thereby improving user experience.

As a preferred mode, an outer edge of the piezoelectric substrate is provided with a first welding spot connected with the surface electrode, and the outer edge of the piezoelectric substrate is provided with a second welding spot connected with the drive electrode; and the first welding spot and the second welding spot are both arranged at edge positions of the ultrasonic atomization sheet and in a fixed region where the ultrasonic atomization sheet is fixed by the holder.

Both ends of the ultrasonic atomization sheet are in a free state, so the amplitudes of both ends of the ultrasonic atomization sheet are the largest; and the holder is fixed in the middle region between two sides of the ultrasonic atomization sheet, so the amplitude of the middle region is small. Therefore, the first welding spot and the second welding spot are arranged in the middle region with relatively small amplitude, which prevents the first welding spot and the second welding spot from being pulled off when the ultrasonic atomization sheet oscillates, thereby ensuring the reliability of conduction and the working reliability of the ultrasonic atomization sheet.

Based on the same inventive concept, the present invention further provides an ultrasonic atomizer, comprising a shell in which a holder is arranged, wherein the structural characteristics of the ultrasonic atomizer are that the ultrasonic atomization sheet is further arranged in the shell, the piezoelectric substrate is composed of an oscillating section and a fixed section connected to each other, the fixed section of the ultrasonic atomization sheet is fixed by the holder, and the oscillating section of the ultrasonic atomization sheet is a free section.

With the above structure, when in use, the fixed section of the ultrasonic atomization sheet is clamped and fixed with the holder, and the oscillating section of the ultrasonic atomization sheet is a free section. During atomization, since the fixed section is clamped and fixed by the holder, the amplitude of the fixed section is relatively weak. The oscillating section of the ultrasonic atomization sheet is a free section without any restriction, so the amplitude is relatively large, the atomization effect is good, and the amount of smoke is large. Due to the good atomization effect of the ultrasonic atomization sheet in the present invention, a large amount of smoke can be produce by a relative small ultrasonic atomization sheet, so the ultrasonic atomization sheet and the ultrasonic electronic cigarette are relatively small in size.

Based on the same inventive concept, the present invention further provides an ultrasonic electronic cigarette, the structural characteristics are that the ultrasonic electronic cigarette comprises the ultrasonic atomizer, wherein an e-liquid guide mechanism and an e-liquid compartment are further arranged in the shell, and the e-liquid compartment is communicated with an atomization surface of the ultrasonic atomization sheet through the e-liquid guide mechanism.

Further, a limit plate is arranged in the shell, the limit plate is located on one side of the ultrasonic atomization sheet, and the e-liquid guide mechanism is located on the other side of the ultrasonic atomization sheet; and there is a gap between the limit plate and the oscillating section of the ultrasonic atomization sheet.

The gap can prevent the ultrasonic atomization sheet from obstructing the amplitude change of the oscillating section during the working process, and prevent the heat generated by the ultrasonic atomization sheet during the working process from being carried away by the limit plate to affect the temperature rise of smoke.

Further, an outer atomization sleeve and an inner atomization sleeve are arranged in the shell, the e-liquid guide mechanism is cup-shaped, a side wall of the e-liquid guide mechanism is sleeved between the outer atomization sleeve and the inner atomization sleeve, and an outer bottom surface of the e-liquid guide mechanism is in contact with the atomization surface of the ultrasonic atomization sheet.

Further, a division plate is arranged in the inner atomization sleeve, the division plate divides the inner atomization sleeve into a first cavity and a second cavity, the first cavity is communicated with the e-liquid compartment, and the second cavity is communicated with an inner bottom surface of the e-liquid guide mechanism; and the side wall of the inner atomization sleeve corresponding to the first cavity is provided with an e-liquid passing groove communicating the e-liquid compartment with the e-liquid guide mechanism.

Further, a mouthpiece is connected to a top of the shell, an air tube is arranged in the shell, one end of the air tube is communicated with an air inlet, the other end of the air tube is communicated with the second cavity, and a side wall of the e-liquid guide mechanism is provided with an air passing hole communicating the second cavity with the mouthpiece.

The inner atomization sleeve is divided into two cavities by the division plate, the side wall of the first cavity is provided with the e-liquid passing groove, and e-liquid in the e-liquid compartment is communicated with the e-liquid guide mechanism through the e-liquid passing groove. The second cavity is a cavity communicated with the atomization surface of the ultrasonic atomization sheet, smoke generated by ultrasonic atomization is stored in the second cavity, air enters the second cavity from the air inlet through the air tube to fully take away the smoke in the second cavity, and the smoke enters the user's mouth through the mouthpiece.

As a preferred mode, the length direction of the ultrasonic atomization sheet is parallel to the length direction of the electronic cigarette.

Compared with the prior art, the present invention has good atomization effect, smaller size and longer service life and can produce larger amount of smoke.

Figure 1:
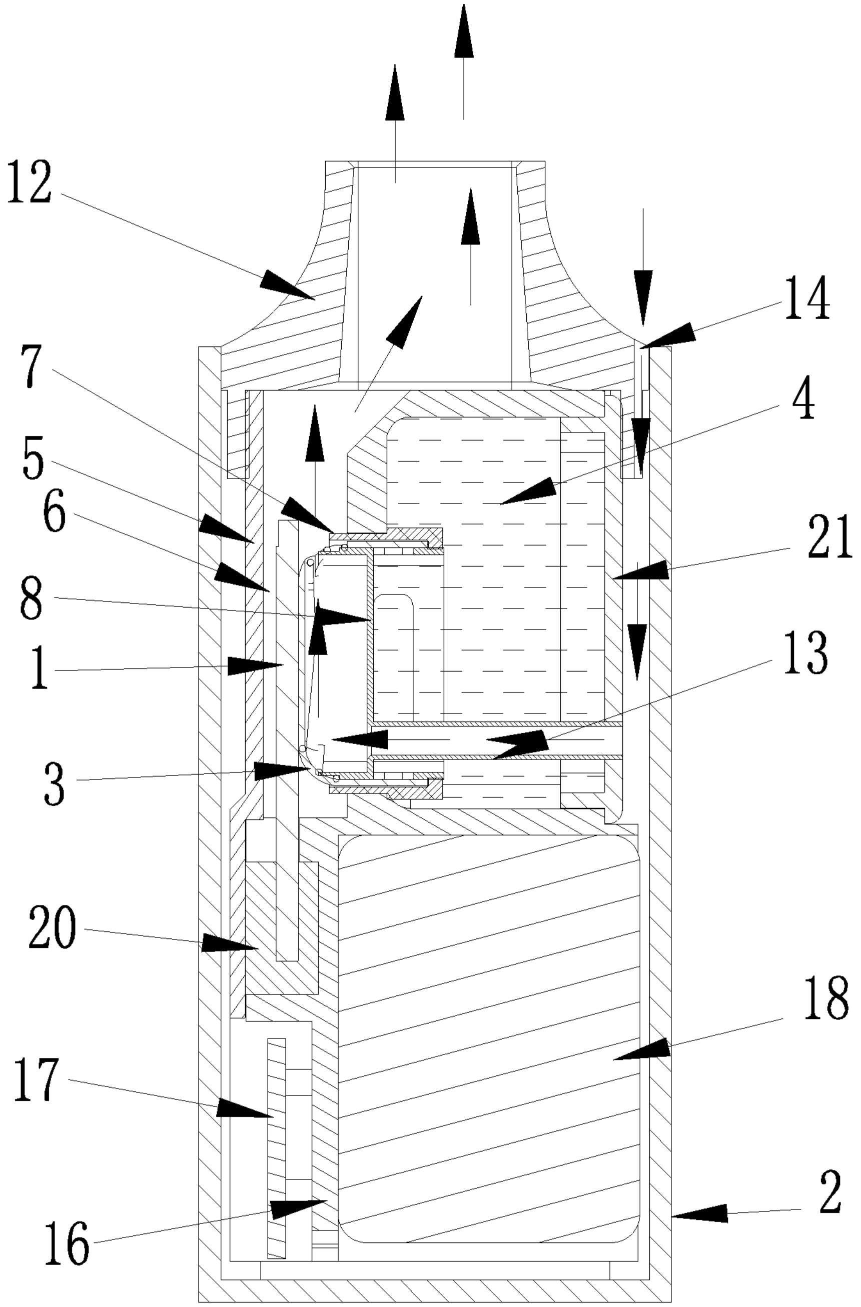
FIG. 1 is a schematic structural diagram of an embodiment of an ultrasonic electronic cigarette.
Figure 2:
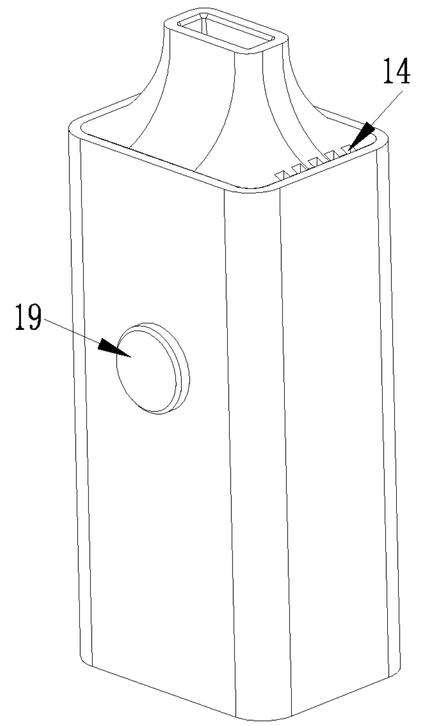
FIG. 2 is an external view of FIG. 1.
Figure 3:
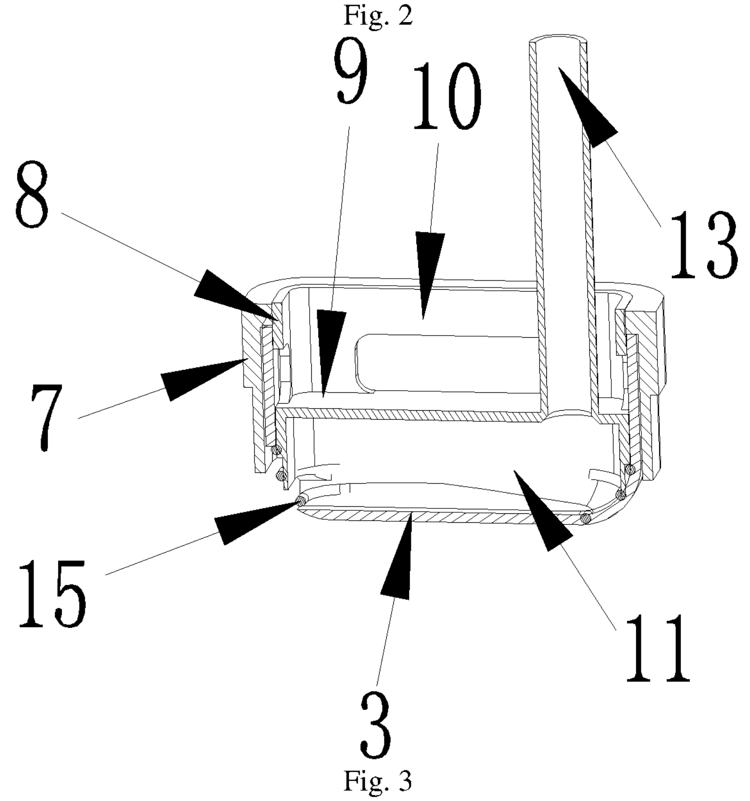
FIG. 3 is a diagram showing a connection relationship between an inner atomization sleeve, an e-liquid guide mechanism and an outer atomization sleeve.
Figure 4:
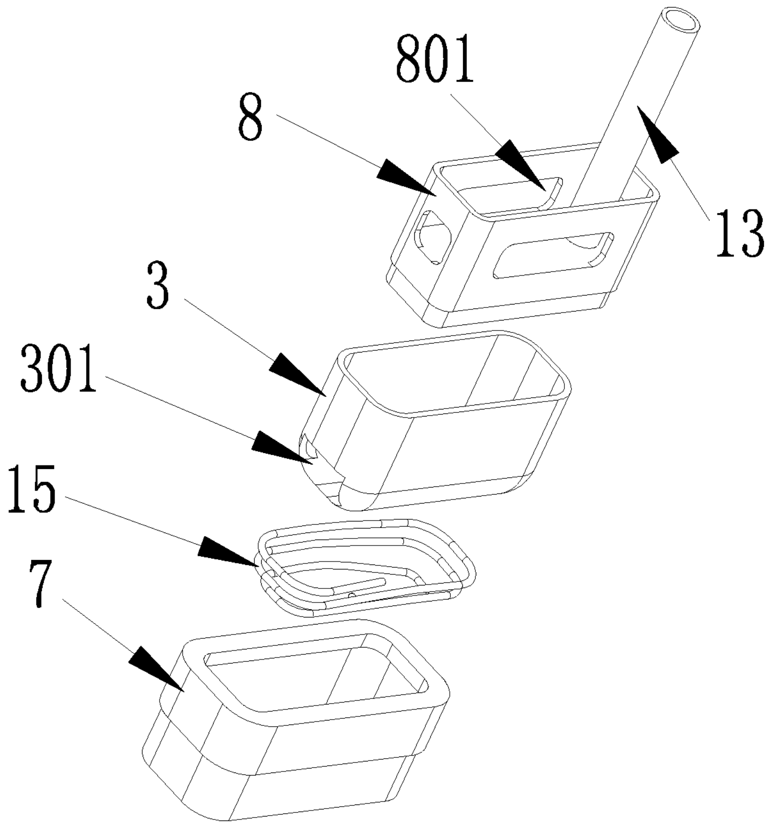
FIG. 4 is an exploded view of FIG. 3.
Figure 5:
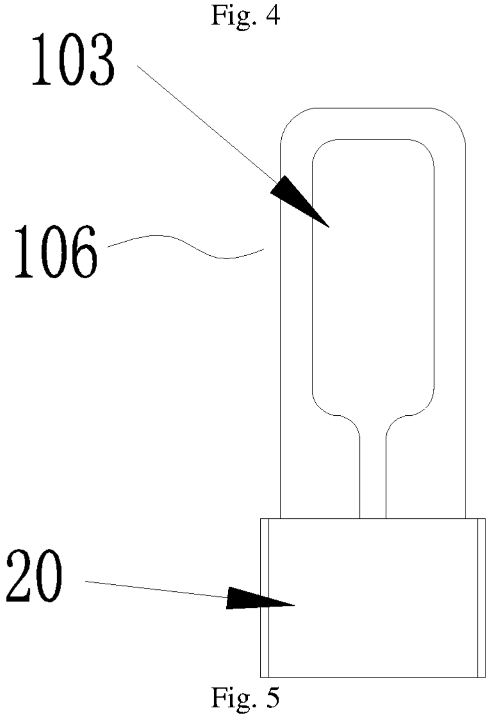
FIG. 5 is a diagram showing a connection relationship between a holder and an ultrasonic atomization sheet.
Figure 6:
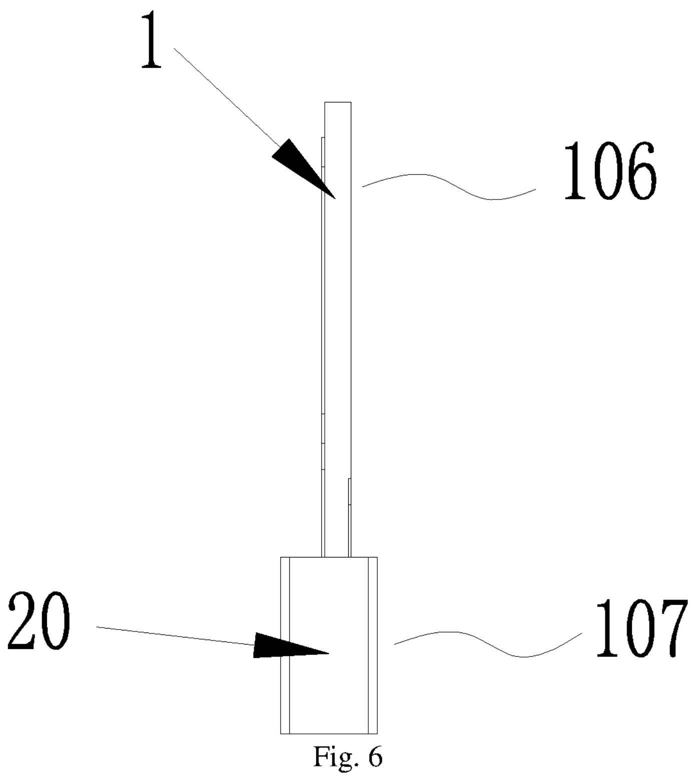
FIG. 6 is a right view of FIG. 5.
Figure 7:
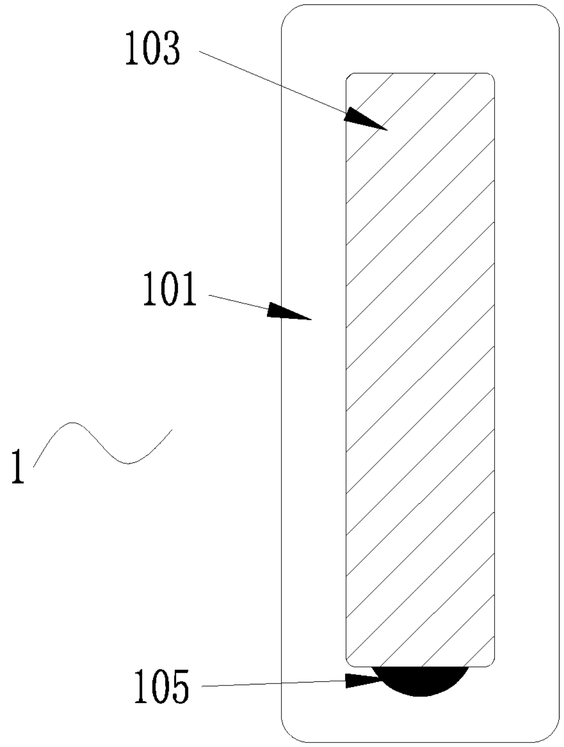
FIG. 7 is a left view of the second embodiment of the ultrasonic atomization sheet according to the present invention.
Figure 8:
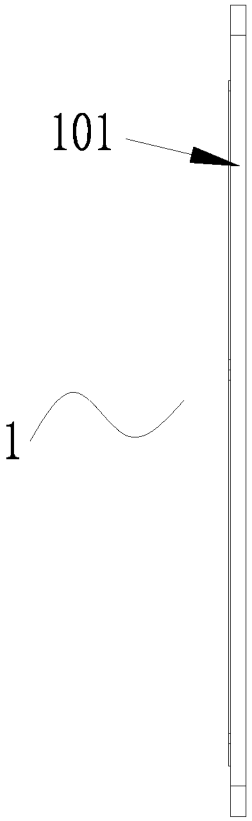
FIG. 8 is a right view of the second embodiment of the ultrasonic atomization sheet according to the present invention.
Figure 9:
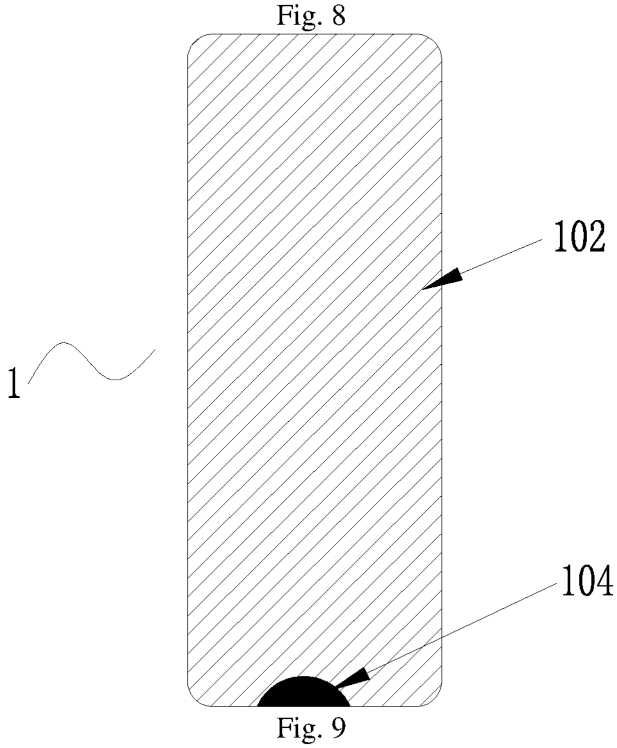
FIG. 9 is a front view of the second embodiment of the ultrasonic atomization sheet according to the present invention.
Figure 10:
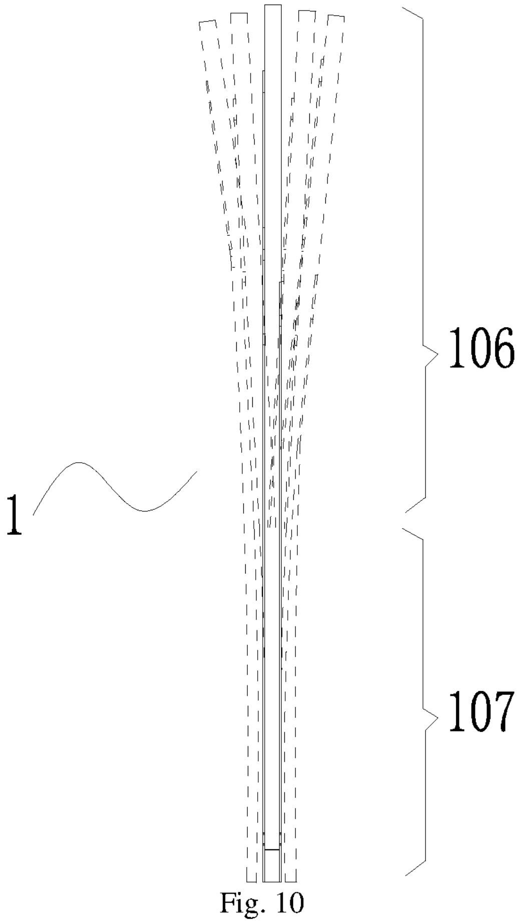
FIG. 10 is a diagram showing an atomization state of the second embodiment of the ultrasonic atomization sheet according to the present invention.
Figure 11:
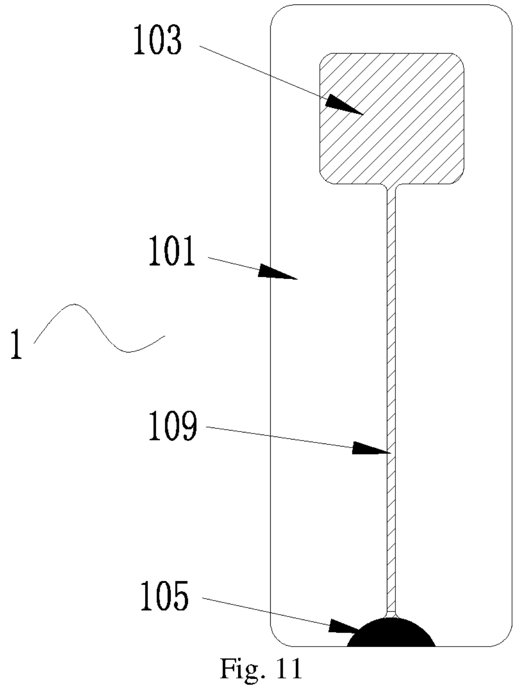
FIG. 11 is a left view of the third embodiment of the ultrasonic atomization sheet according to the present invention.
Figure 12:
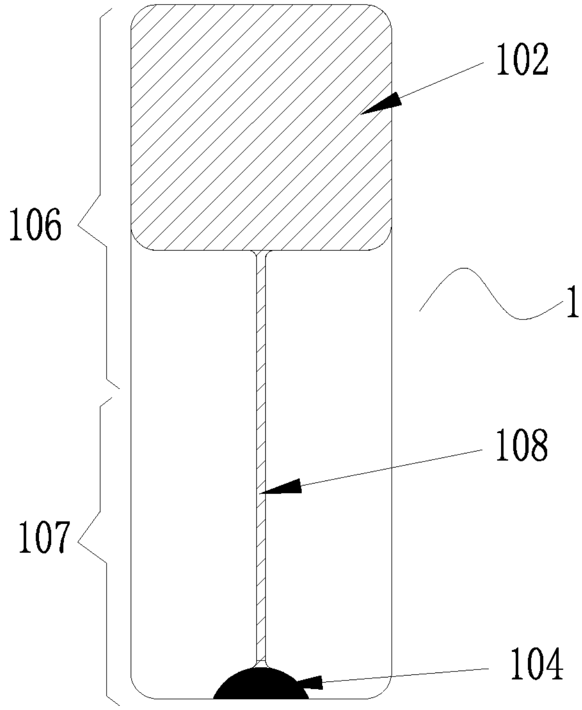
FIG. 12 is a right view of the third embodiment of the ultrasonic atomization sheet according to the present invention.
Figure 13:
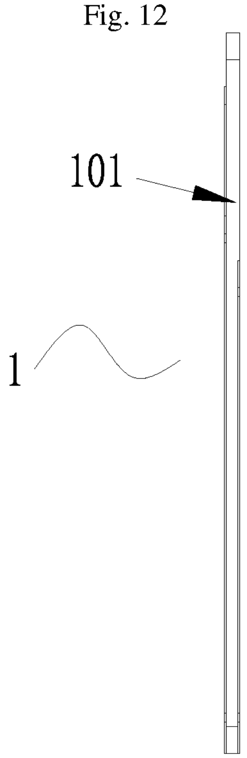
FIG. 13 is a front view of the third embodiment of the ultrasonic atomization sheet according to the present invention.
Figure 14:
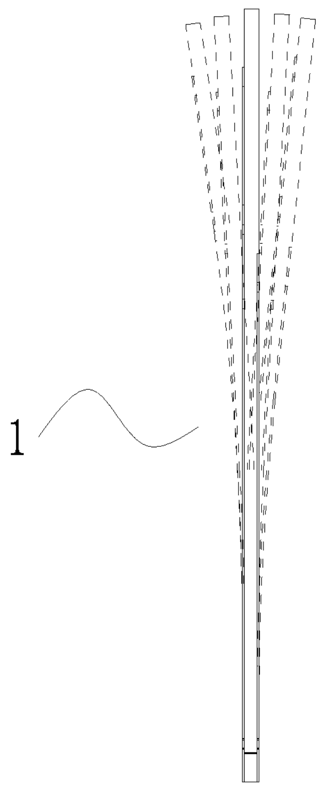
FIG. 14 is a diagram showing an atomization state of the third embodiment of the ultrasonic atomization sheet according to the present invention.

In the figures: 1 ultrasonic atomization sheet, 101 piezoelectric substrate, 102 surface electrode, 103 drive electrode, 104 first welding spot, 105 second welding spot, 106 oscillating section, 107 fixed section, 108 first conductive lead, 109 second conductive lead, I represents attachment region, II represents exposed region, 2 shell, 3 e-liquid guide mechanism, 301 air passing hole, 4 e-liquid compartment, 5 limit plate, 6 gap, 7 outer atomization sleeve, 8 inner atomization sleeve, 801 e-liquid passing groove, 9 division plate, 10 first cavity, 11 second cavity, 12 mouthpiece, 13 air tube, 14 air inlet, 15 spring, 16 support, 17 PCB, 18 battery, 19 button, 20 holder, 21 e-liquid cover.

DETAILED DESCRIPTION OF EMBODIMENTS

As shown in FIGS. 1 to 6, an ultrasonic electronic cigarette comprises a shell 2; a holder 20, an ultrasonic atomization sheet 1, an e-liquid guide mechanism 3, and an e-liquid compartment 4 are arranged in the shell 2; the ultrasonic atomization sheet 1 is fixed by the holder 20, and the e-liquid compartment 4 is communicated with an atomization surface of the ultrasonic atomization sheet 1 through the e-liquid guide mechanism 3; the ultrasonic atomization sheet 1 comprises a flaky piezoelectric substrate 101, a surface electrode 102 fixed on one surface of the piezoelectric substrate 101, and a drive electrode 103 fixed on the other surface of the piezoelectric substrate 101, and the piezoelectric substrate 101 is elongated; the piezoelectric substrate 101 is composed of an oscillating section 106 and a fixed section 107 connected to each other, the fixed section 107 is fixed by the holder 20, a surface of the oscillating section 106 is in contact with e-liquid, the e-liquid is atomized by high-frequency oscillation to produce smoke, and the oscillating section 106 is a free section in an atomization cavity of the ultrasonic electronic cigarette. The e-liquid guide mechanism 3 transfers the e-liquid in the e-liquid compartment 4 to the oscillating section 106 for atomization; the material of the e-liquid guide mechanism 3 is oleophyllic e-liquid guide cotton, the holder 20 is made of a material with certain elasticity, such as silica gel, and the material of the piezoelectric substrate 101 is piezoelectric ceramic.

Because the piezoelectric substrate 101 is elongated, the ultrasonic atomization sheet 1 made of the elongated piezoelectric substrate is also elongated, which reduces the size of an ultrasonic electronic cigarette using the ultrasonic atomization sheet 1 to facilitate carrying by users.

In this embodiment, the ultrasonic atomization sheet 1 of the ultrasonic electronic cigarette is clamped to the fixed section 107 of the ultrasonic atomization sheet 1 by the holder 20; the oscillating section 106 of the ultrasonic atomization sheet 1 is in contact with the e-liquid guide cotton. During the atomization process, since the fixed section 107 is clamped and fixed by the holder 20, the amplitude of the fixed section 107 is relatively weak; and the oscillating section 106 of the ultrasonic atomization sheet 1 is a free section without any restriction, so the amplitude is relatively large, the atomization effect is good, and the amount of smoke is large.

A limit plate 5 is arranged in the shell 2, and an atomization cavity (not shown in the figures) is formed between the limit plate 5 and the e-liquid compartment 4; the oscillating section 106 of the ultrasonic atomization sheet 1 is inserted into the atomization cavity, and the fixed section 107 of the ultrasonic atomization sheet 1 is arranged outside the atomization cavity and is clamped and fixed by the holder 20; one end of the e-liquid guide mechanism 3 is inserted into the e-liquid compartment 4, and the other end of the e-liquid guide mechanism 3 extends into the atomization cavity and is in contact with the oscillating section 106 of the ultrasonic atomization sheet 1; the e-liquid guide mechanism 3 in this embodiment is perpendicular to the oscillating section 106 of the ultrasonic atomization sheet 1, and there is a gap 6 between the limit plate 5 and the oscillating section 106 of the ultrasonic atomization sheet 1, which increases the amplitude of the oscillating section 106 of the ultrasonic atomization sheet 1 during high-frequency oscillation and improves the atomization effect.

Since there is the gap 6 between the limit plate 5 and the oscillating section 106 of the ultrasonic atomization sheet 1, the heat generated during the operation of the ultrasonic atomization sheet 1 is slowly dissipated to the limit plate 5, and the heat can be further absorbed by smoke to improve the taste of smoke. In addition, because the ultrasonic atomization sheet 1 is elongated, the high temperature generated during the operation of the oscillating section 106 can be transferred to the fixed section 107, which can prevent the oscillating section 106 from being broken due to the high temperature during operation, and prolong the service life of the ultrasonic atomization sheet 1.

An outer atomization sleeve 7 and an inner atomization sleeve 8 are arranged in the shell 2. The e-liquid guide mechanism 3 is of an elongated cup-shaped structure in the same shape as the ultrasonic atomization sheet 1, which can improve the contact area between the e-liquid guide mechanism 3 and the ultrasonic atomization sheet 1. Side walls of the e-liquid guide mechanism 3 are sleeved between the outer atomization sleeve 7 and the inner atomization sleeve 8, and an outer bottom surface of the e-liquid guide mechanism 3 is in contact with the atomization surface of the ultrasonic atomization sheet 1.

A division plate 9 is arranged in the inner atomization sleeve 8, the division plate 9 divides the inner atomization sleeve 8 into a first cavity 10 and a second cavity 11, the first cavity 10 is communicated with the e-liquid compartment 4, and the second cavity 11 is communicated with an inner bottom surface of the e-liquid guide mechanism 3; the side wall of the inner atomization sleeve 8 corresponding to the first cavity 10 is provided with an e-liquid passing groove 801 communicating the e-liquid compartment 4 with the e-liquid guide mechanism 3, and the e-liquid in the e-liquid compartment 4 is in contact with the e-liquid guide mechanism 3 through the e-liquid passing groove 801.

A mouthpiece 12 is connected to a top of the shell 2, an air tube 13 is arranged in the shell 2, one end of the air tube 13 is communicated with an air inlet 14, the other end of the air tube 13 passes through the first cavity 10 and is communicated with the second cavity 11, and a side wall of the e-liquid guide mechanism 3 is provided with an air passing hole 301 communicating the second cavity 11 with the mouthpiece 12.

The second cavity 11 is a cavity communicated with the atomization surface of the ultrasonic atomization sheet 1, smoke generated by ultrasonic atomization is stored in the second cavity 11, air enters the second cavity 11 from the air inlet 14 through the air tube to take away the smoke in the second cavity 11 from the air passing hole 301, and the smoke enters the user's mouth through the mouthpiece 12.

The length direction of the ultrasonic atomization sheet 1 is parallel to the length direction of the electronic cigarette, which is beneficial to the miniaturization of the ultrasonic electronic cigarette.

A spring 15 is arranged in the shell 2, one end of the spring 15 abuts against an outer wall of the inner atomization sleeve 8, and the other end of the spring 15 abuts against the inner bottom surface of the e-liquid guide mechanism 3. The spring 15 is used to achieve reliable contact between the e-liquid guide mechanism 3 and the ultrasonic atomization sheet.

A support 16, a PCB (printed circuit board) 17 and a battery 18 are further arranged in the shell 2, and the PCB 17, the battery 18, the holder 20 and the outer atomization sleeve 7 are all fixed by the support 16. The holder 20 is fixed on the support 16 by the limit plate 5, so as to fix the ultrasonic atomization sheet 1 to prevent the ultrasonic atomization sheet 1 from tilting during operation to affect the atomization effect. An e-liquid cover 21 is arranged at an opening of the e-liquid compartment 4, and the e-liquid compartment 4 can be filled with e-liquid after the e-liquid cover 21 is opened.

A side wall of the shell 2 is provided with a button 19 for controlling whether the ultrasonic electronic cigarette operates.

FIGS. 7 to 10 show a structure of the second embodiment of the ultrasonic atomization sheet. In the second embodiment, the ultrasonic atomization sheet 1 comprises a flaky piezoelectric substrate 101, a surface electrode 102 fixed on one surface of the piezoelectric substrate 101, and a drive electrode 103 fixed on the other surface of the piezoelectric substrate 101, and the piezoelectric substrate 101 is elongated.

One surface of the piezoelectric substrate 101 is fully covered by the surface electrode 102, the central region of the other surface of the piezoelectric substrate 101 is covered by the drive electrode 103, and the area ratio of the surface electrode 102 to the drive electrode 103 is 3:2 to 4:1, preferably 2:1 in this embodiment. The atomization area is large, the amount of smoke produced is large, and the atomization effect is good.

An outer edge of the piezoelectric substrate 101 is provided with a first welding spot 104 connected with the surface electrode 102, and the outer edge of the piezoelectric substrate 101 is provided with a second welding spot 105 connected with the drive electrode 103. Two poles of a power source are respectively connected to the first welding spot 104 and the second welding spot 105 to realize electrical connection between the two poles of the power source and the surface electrode 102 and the drive electrode 103.

The material of the piezoelectric substrate 101 is piezoelectric ceramic.

The first welding spot 104 and the second welding spot 105 are both arranged on the fixed section 107 of the ultrasonic atomization sheet 1. The ultrasonic atomization sheet 1 is composed of a fixed section 107 and an oscillating section 106. Accordingly, in the ultrasonic electronic cigarette using the ultrasonic atomization sheet 1, the fixed section 107 is fixed by the holder 20, so the fixed section 107 has small atomization amplitude.

The first welding spot 104 and the second welding spot 105 are arranged on the fixed section 107 with small amplitude, which prevents the first welding spot 104 and the second welding spot 105 from being pulled off when the ultrasonic atomization sheet 1 performs atomization, thereby ensuring the reliability of conduction and the working reliability of the ultrasonic atomization sheet 1. In addition, the first welding spot 104 and the second welding spot 105 are arranged on the fixed section, which can also avoid the production of high temperature during welding to affect the performance of the oscillating section 106; and the oscillating section 106 of the ultrasonic atomization sheet 1 is a free section to increase the amount of atomized smoke.

FIGS. 11 to 14 show a structure of the third embodiment of the ultrasonic atomization sheet. In the third embodiment, the ultrasonic atomization sheet 1 comprises a flaky piezoelectric substrate 101, a surface electrode 102 fixed on one surface of the piezoelectric substrate 101, and a drive electrode 103 fixed on the other surface of the piezoelectric substrate 101. The piezoelectric substrate 101 is elongated, the piezoelectric substrate 101 is composed of an oscillating section 106 and a fixed section 107 connected to each other, the surface electrode 102 is fixed on one surface of the oscillating section 106, and the drive electrode 103 is fixed on the other surface of the oscillating section 106.

The material of the piezoelectric substrate 101 is piezoelectric ceramic.

After the surface electrode 102 and the drive electrode 103 are energized, the oscillating section 106 performs high-frequency atomization under the drive of electric potential changes, and the atomization amplitude of the oscillating section 106 is the largest, so that e-liquid or other smoking material on the surface of the oscillating section 106 is atomized to produce smoke.

The surface electrode 102 and the drive electrode 103 are both rectangular, which can improve the atomization effect of the ultrasonic atomization sheet.

One surface of the oscillating section 106 is fully covered by the surface electrode 102, a central region of the other surface of the oscillating section 106 is covered by the drive electrode 103, and the area ratio of the surface electrode 102 to the drive electrode 103 is 3:2 to 4:1, preferably 2:1 in this embodiment.

The piezoelectric substrate 101 is further provided with a first welding spot 104 connected with the surface electrode 102 and a second welding spot 105 connected with the drive electrode 103.

Two poles of a power source are respectively connected to the first welding spot 104 and the second welding spot 105 to realize electrical connection between the two poles of the power source and the surface electrode 102 and the drive electrode 103.

The first welding spot 104 and the second welding spot 105 are both arranged on an outer surface of the fixed section 107, a first conductive lead 108 connecting the first welding spot 104 with the surface electrode 102 is fixed on the piezoelectric substrate 101, and a second conductive lead 109 connecting the second welding spot 105 with the drive electrode 103 is fixed on the piezoelectric substrate 101.

The first welding spot 104 and the second welding spot 105 are arranged on the fixed section 107 with small amplitude, which prevents the first welding spot 104 and the second welding spot 105 from being pulled off when the ultrasonic atomization sheet 1 performs atomization, thereby ensuring the reliability of conduction and the working reliability of the ultrasonic atomization sheet 1. In addition, the first welding spot 104 and the second welding spot 105 are arranged on the fixed section 107, which can also avoid the production of high temperature during welding to affect the performance of the oscillating section 106.

Figure 15:
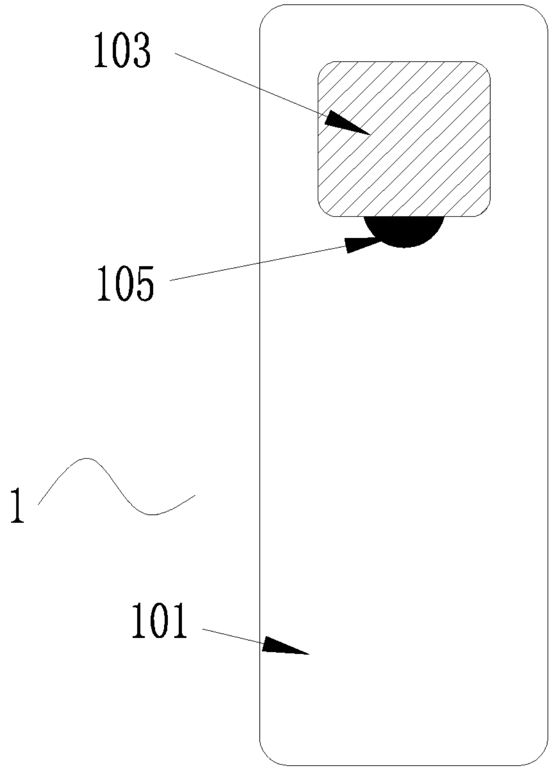
FIG. 15 is a front view of the fourth embodiment of the ultrasonic atomization sheet according to the present invention.
Figure 16:
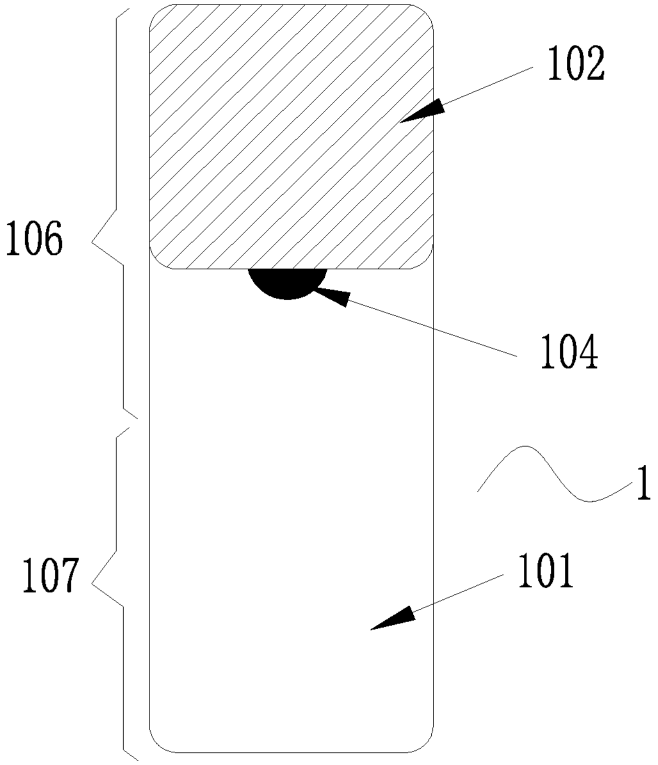
FIG. 16 is a rear view of the fourth embodiment of the ultrasonic atomization sheet according to the present invention.

FIGS. 15 and 16 show a structure of the fourth embodiment of the ultrasonic atomization sheet. The fourth embodiment repeats the third embodiment, and the differences lie in that the first conductive lead 108 and the second conductive lead 109 are not included in the fourth embodiment, the first welding spot 104 is arranged at an outer edge of the surface electrode 102, and the second welding spot 105 is arranged at an outer edge of the drive electrode 103. The first welding spot 104 is directly arranged next to the surface electrode 102, and the second welding spot 105 is directly arranged next to the drive electrode 103, thereby avoiding the use of conductive leads to connect the welding spots and the electrodes and reducing the cost.

Figure 17:
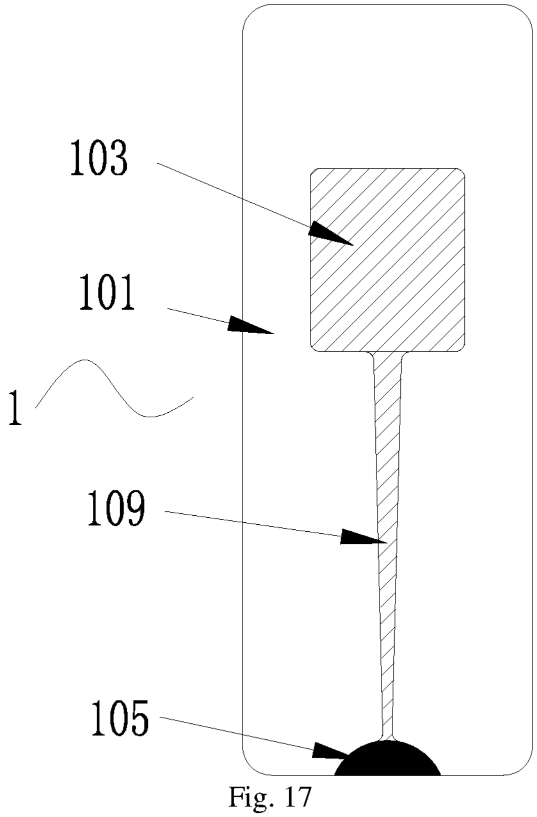
FIG. 17 is a left view of the fifth embodiment of the ultrasonic atomization sheet according to the present invention.
Figure 18:
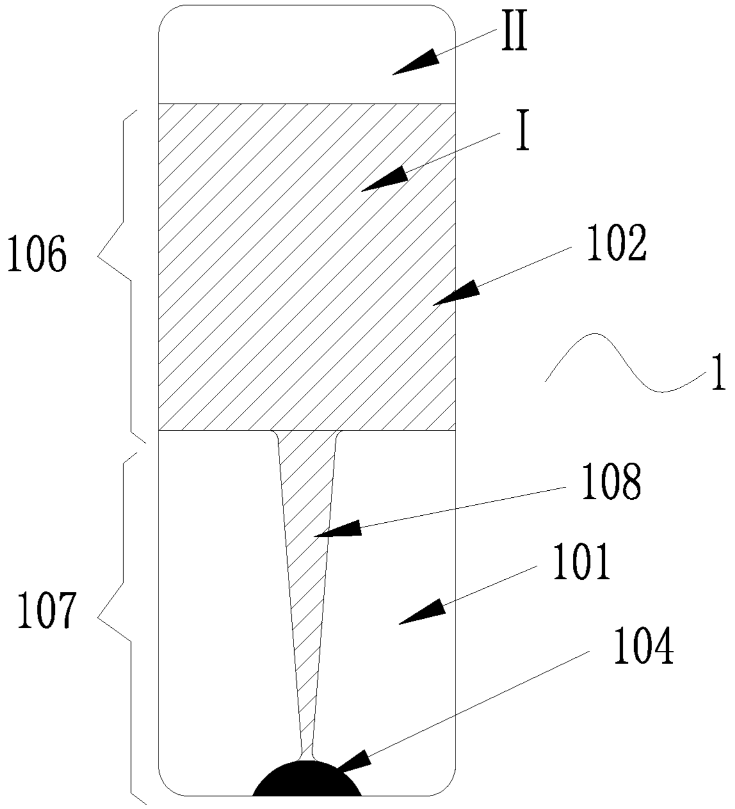
FIG. 18 is a right view of the fifth embodiment of the ultrasonic atomization sheet according to the present invention.
Figure 19:
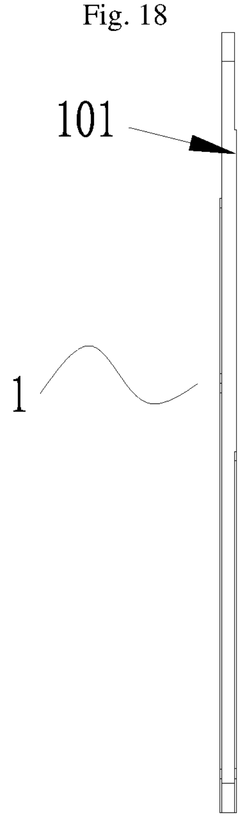
FIG. 19 is a front view of the fifth embodiment of the ultrasonic atomization sheet according to the present invention.

FIGS. 17 to 19 show a structure of the fifth embodiment of the ultrasonic atomization sheet. The fifth embodiment repeats the third embodiment, and the differences lie in that the shape of the first conductive lead 108 is an isosceles trapezoid, a large end of the first conductive lead 108 is connected to the surface electrode 102 in a smooth transition manner, and a small end of the first conductive lead 108 is connected to the first welding spot 104 in a smooth transition manner; the shape of the second conductive lead 109 is an isosceles trapezoid, a large end of the second conductive lead 109 is connected to the drive electrode 103 in a smooth transition manner, and a small end of the second conductive lead 109 is connected to the second welding spot 105 in a smooth transition manner. There are no sharp corners at the transition connection positions between the first conductive lead 108 and the surface electrode 102 and between the second conductive lead 109 and the drive electrode 103, which facilitates processing and achieves more stable adhesion.

Moreover, in the fifth embodiment, one surface of the oscillating section 106 is composed of an attachment region I fixed with the surface electrode 102 and an exposed region II not fixed with the surface electrode 102, the attachment region I and the exposed region II are arranged along the length direction of the oscillating section 106, and the attachment region I is closer to the fixed section 107 than the exposed region II; and the area ratio of the surface electrode 102 to the drive electrode 103 is 2:1.

The surface electrode 102 is provided at a distance from an end of the oscillating section 106, such that the heat generated by the ultrasonic atomization sheet 1 during the atomization process can be diffused to both ends. Therefore, faster heat dissipation and better atomization effect can be achieved, the oscillating section 106 is prevented from being broken due to high temperature, and the service life of the ultrasonic atomization sheet 1 is prolonged.

Figure 20:
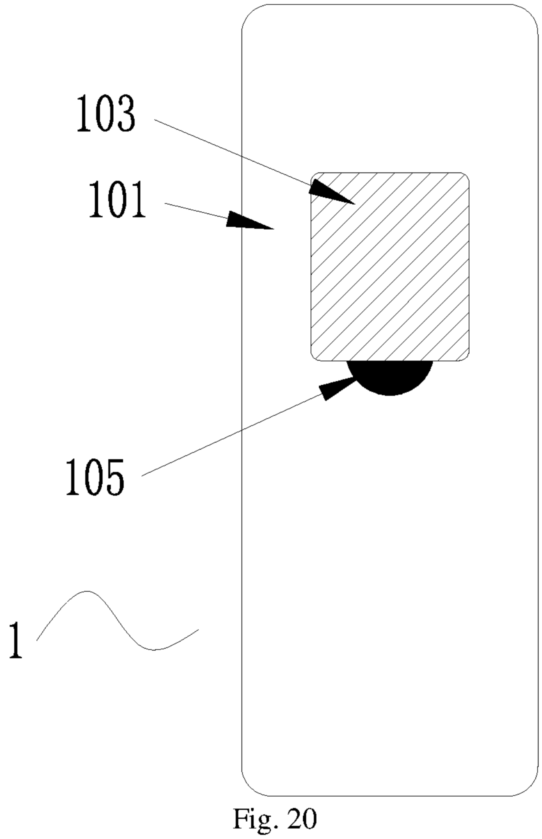
FIG. 20 is a left view of the sixth embodiment of the ultrasonic atomization sheet according to the present invention.
Figure 21:
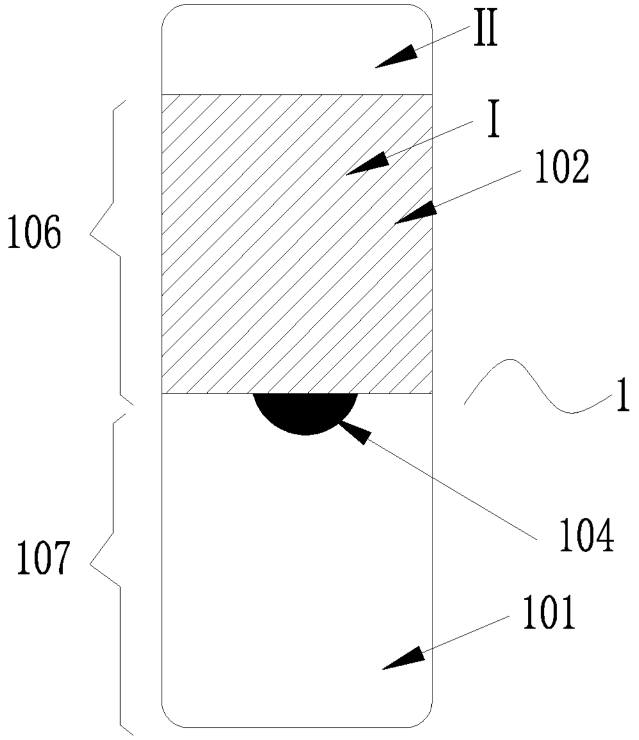
FIG. 21 is a right view of the sixth embodiment of the ultrasonic atomization sheet according to the present invention.
Figure 22:
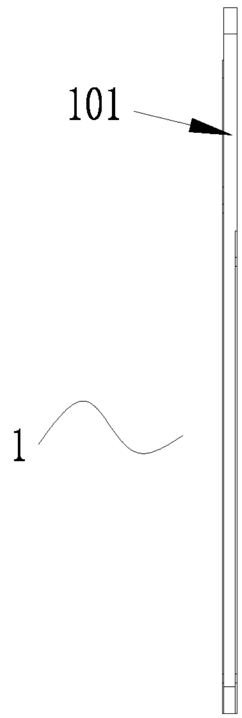
FIG. 22 is a front view of the sixth embodiment of the ultrasonic atomization sheet according to the present invention.
Figure 23:
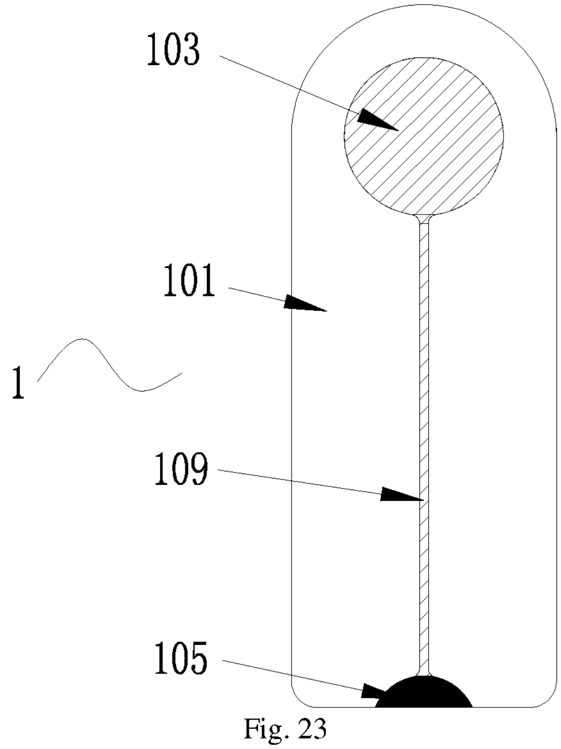
FIG. 23 is a left view of the seventh embodiment of the ultrasonic atomization sheet according to the present invention.
Figure 24:
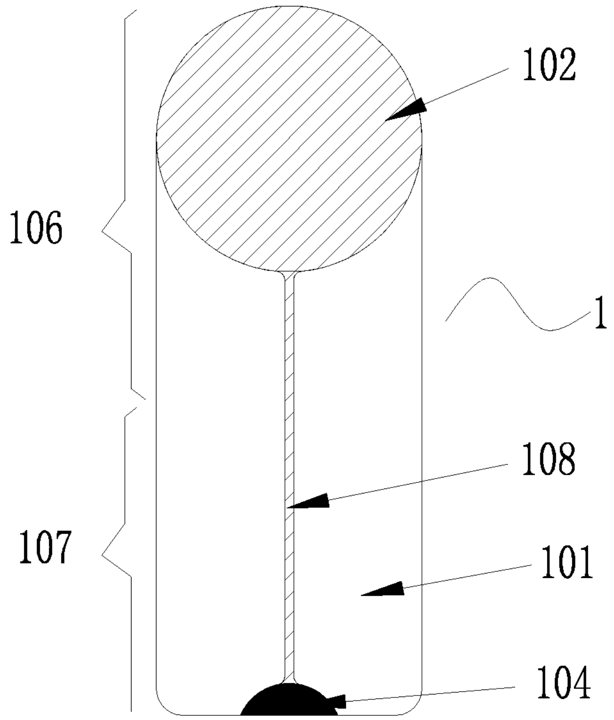
FIG. 24 is a right view of the seventh embodiment of the ultrasonic atomization sheet according to the present invention.
Figure 25:
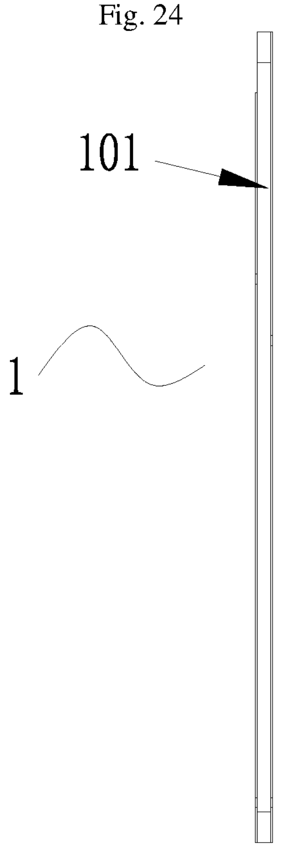
FIG. 25 is a front view of the seventh embodiment of the ultrasonic atomization sheet according to the present invention.
Figure 26:
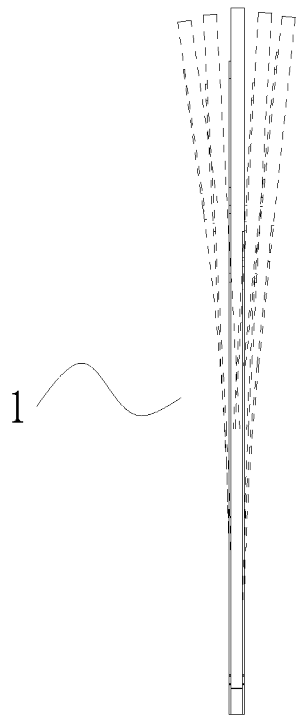
FIG. 26 is a diagram showing an atomization state of the seventh embodiment of the ultrasonic atomization sheet according to the present invention.

FIGS. 20-22 show a structure of the sixth embodiment of the ultrasonic atomization sheet. The sixth embodiment repeats the fourth embodiment, and the differences lie in that one surface of the oscillating section 106 is composed of an attachment region I fixed with the surface electrode 102 and an exposed region II not fixed with the surface electrode 102, the attachment region I and the exposed region II are arranged along the length direction of the oscillating section 106, and the attachment region I is closer to the fixed section 107 than the exposed region II; and the area ratio of the surface electrode 102 to the drive electrode 103 is 3:2 to 4:1, preferably 2:1 in this embodiment.

The surface electrode 102 is provided at a distance from an end of the oscillating section 106, so that the heat generated by the ultrasonic atomization sheet 1 during the atomization process can be diffused to both ends. Therefore, faster heat dissipation and better atomization effect can be achieved, the oscillating section 106 is prevented from being broken due to high temperature, and the service life of the ultrasonic atomization sheet 1 is prolonged.

FIGS. 23 to 26 show a structure of the seventh embodiment of the ultrasonic atomization sheet. In the seventh embodiment, the ultrasonic atomization sheet 1 comprises a flaky piezoelectric substrate 101, a surface electrode 102 fixed on one surface of the piezoelectric substrate 101, and a drive electrode 103 fixed on the other surface of the piezoelectric substrate 101, wherein the structural characteristics are that the piezoelectric substrate 101 is elongated, the piezoelectric substrate 101 is composed of an oscillating section 106 and a fixed section 107 connected to each other, the surface electrode 102 is fixed on one surface of the oscillating section 106, and the drive electrode 103 is fixed on the other surface of the oscillating section 106. The surface electrode 102 and the drive electrode 103 are both circular.

The material of the piezoelectric substrate 101 is piezoelectric ceramic.

After the surface electrode 102 and the drive electrode 103 are energized, the oscillating section 106 performs high-frequency atomization under the drive of electric potential changes, and the atomization amplitude of the oscillating section 106 is the largest, so that e-liquid or other smoking material on the surface of the oscillating section 106 is atomized to produce smoke.

An outer end of the oscillating section 106 is an arc surface. One surface of the oscillating section 106 is fully covered by the surface electrode 102, a central region of the other surface of the oscillating section 106 is covered by the drive electrode 103, and the area ratio of the surface electrode 102 to the drive electrode 103 is 2:1.

The piezoelectric substrate 101 is further provided with a first welding spot 104 connected with the surface electrode 102 and a second welding spot 105 connected with the drive electrode 103.

Two poles of a power source are respectively connected to the first welding spot 104 and the second welding spot 105 to realize electrical connection between the two poles of the power source and the surface electrode 102 and the drive electrode 103.

The first welding spot 104 and the second welding spot 105 are both arranged on an outer surface of the fixed section 107, a first conductive lead 108 connecting the first welding spot 104 with the surface electrode 102 is fixed on the piezoelectric substrate 101, and a second conductive lead 109 connecting the second welding spot 105 with the drive electrode 103 is fixed on the piezoelectric substrate 101.

The first welding spot 104 and the second welding spot 105 are arranged on the fixed section 107 with small amplitude, which prevents the first welding spot 104 and the second welding spot 105 from being pulled off when the ultrasonic atomization sheet 1 performs atomization, thereby ensuring the reliability of conduction and the working reliability of the ultrasonic atomization sheet 1. In addition, the first welding spot 104 and the second welding spot 105 are arranged on the fixed section 107, which can also avoid the production of high temperature during welding to affect the performance of the oscillating section 106.

Figure 27:
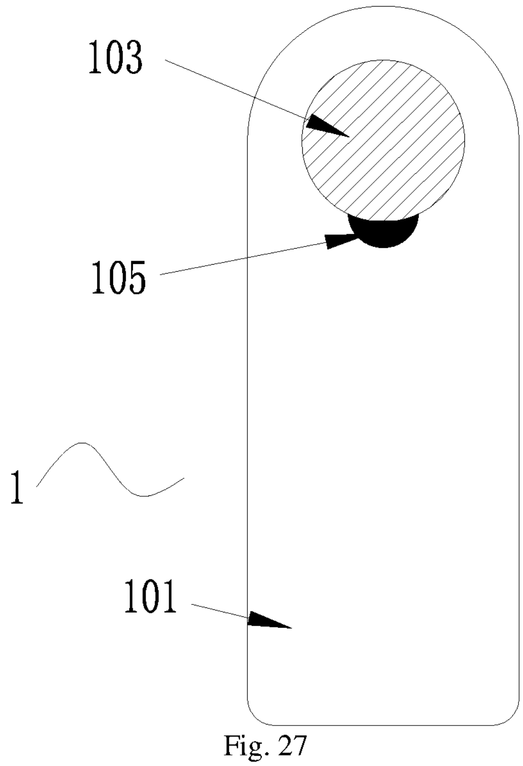
FIG. 27 is a front view of the eighth embodiment of the ultrasonic atomization sheet according to the present invention.
Figure 28:
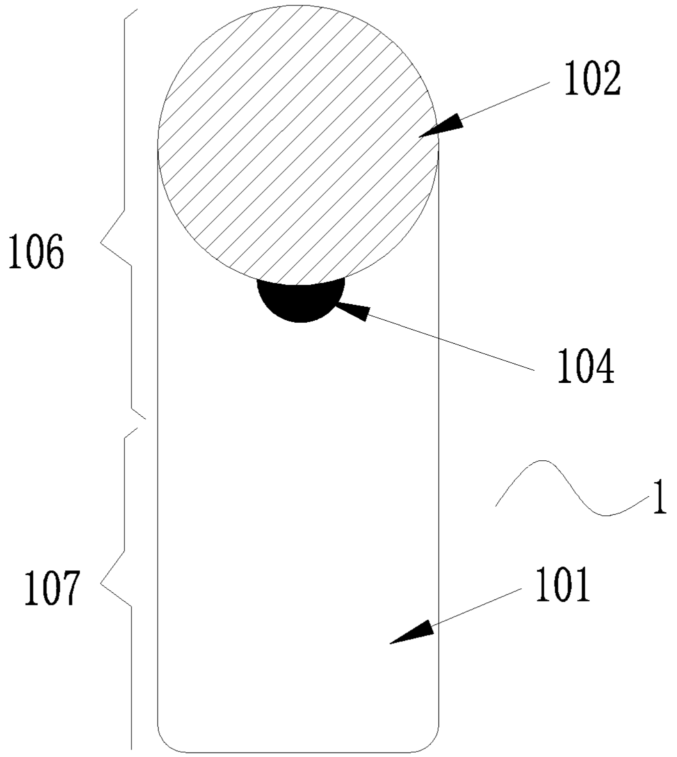
FIG. 28 is a rear view of the eighth embodiment of the ultrasonic atomization sheet according to the present invention.

FIGS. 27 and 28 show a structure of the eighth embodiment of the ultrasonic atomization sheet. The eighth embodiment repeats the seventh embodiment, and the differences lie in that the first conductive lead 108 and the second conductive lead 109 are not included in the eighth embodiment, the first welding spot 104 is arranged at an outer edge of the surface electrode 102, and the second welding spot 105 is arranged at an outer edge of the drive electrode 103. The first welding spot 104 is directly arranged next to the surface electrode 102, and the second welding spot 105 is directly arranged next to the drive electrode 103, thereby avoiding the use of conductive leads to connect the welding spots and the electrodes and reducing the cost.

Figure 29:
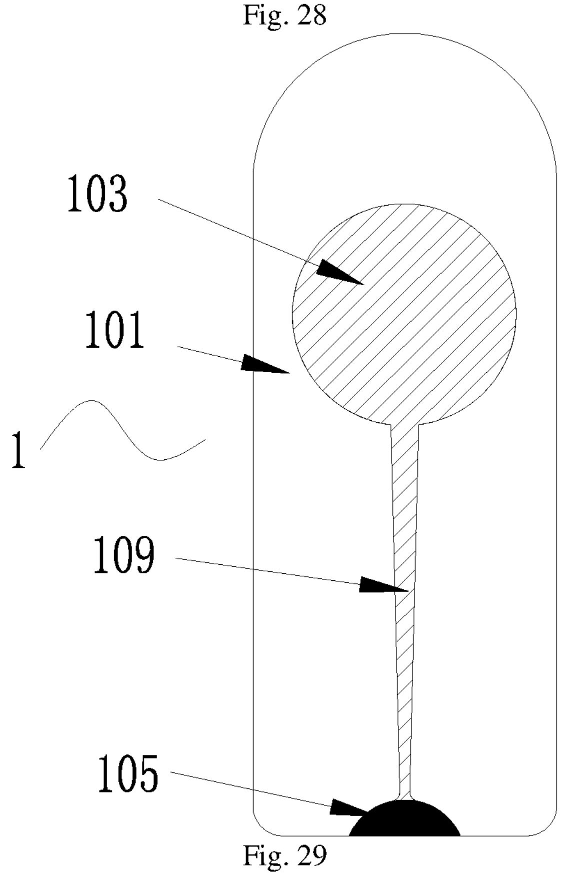
FIG. 29 is a left view of the ninth embodiment of the ultrasonic atomization sheet according to the present invention.
Figure 30:
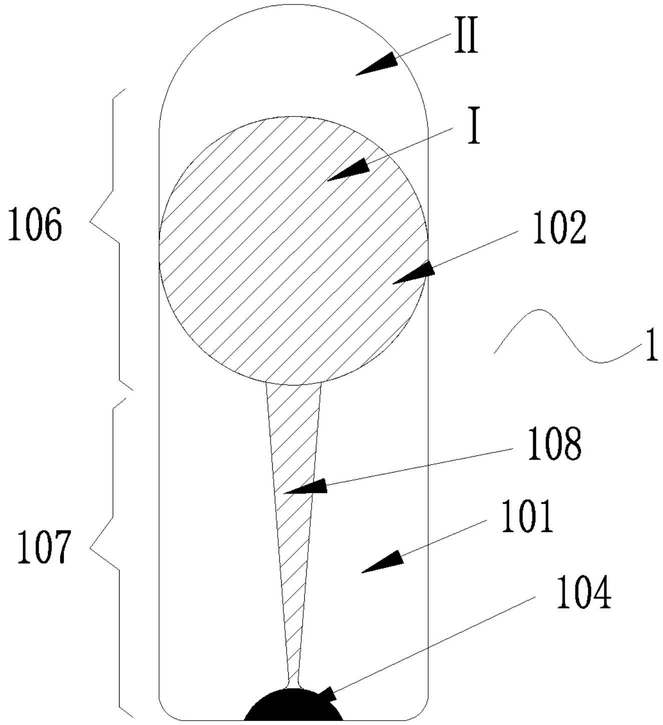
FIG. 30 is a right view of the ninth embodiment of the ultrasonic atomization sheet according to the present invention.
Figure 31:
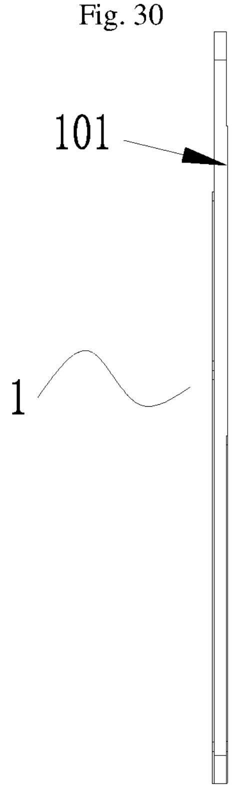
FIG. 31 is a front view of the ninth embodiment of the ultrasonic atomization sheet according to the present invention.

FIGS. 29 to 31 show a structure of the ninth embodiment of the ultrasonic atomization sheet. The ninth embodiment repeats the seventh embodiment, and the differences lie in that the shape of the first conductive lead 108 is an isosceles trapezoid, a large end of the first conductive lead 108 is connected to the surface electrode 102 in a smooth transition manner, and a small end of the first conductive lead 108 is connected to the first welding spot 104 in a smooth transition manner; the shape of the second conductive lead 109 is an isosceles trapezoid, a large end of the second conductive lead 109 is connected to the drive electrode 103 in a smooth transition manner, and a small end of the second conductive lead 109 is connected to the second welding spot 105 in a smooth transition manner. There are no sharp corners at the transition connection positions between the first conductive lead 108 and the surface electrode 102 and between the second conductive lead 109 and the drive electrode 103, which facilitates processing and achieves more stable adhesion.

Moreover, in the ninth embodiment, one surface of the oscillating section 106 is composed of an attachment region I fixed with the surface electrode 102 and an exposed region II not fixed with the surface electrode 102, the attachment region I and the exposed region II are arranged along the length direction of the oscillating section 106, and the attachment region I is closer to the fixed section 107 than the exposed region II; and the area ratio of the surface electrode 102 to the drive electrode 103 is 2:1.

The surface electrode 102 is provided at a distance from an end of the oscillating section 106, so that the heat generated by the ultrasonic atomization sheet 1 during the atomization process can be diffused to both ends to achieve fast heat dissipation and better atomization effect, the oscillating section 106 is prevented from being broken due to high temperature, and the service life of the ultrasonic atomization sheet 1 is prolonged.

Figure 32:
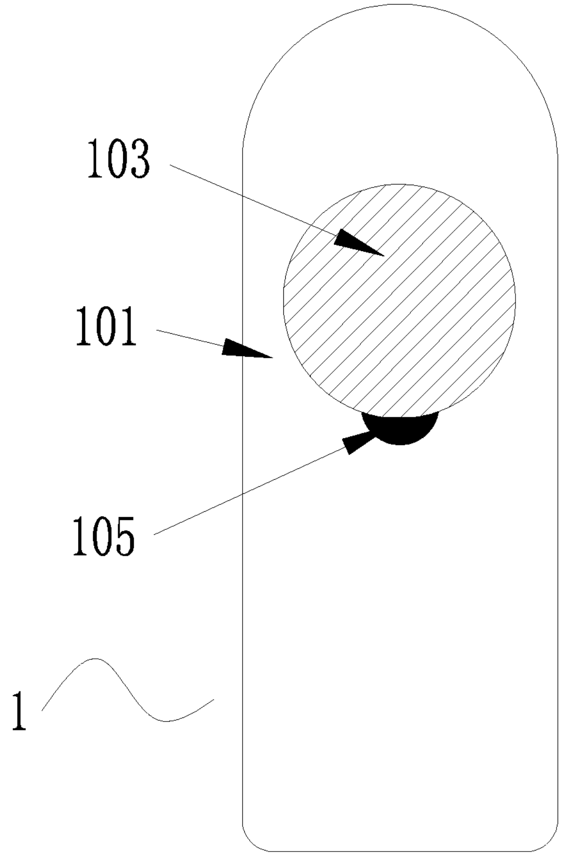
FIG. 32 is a left view of the tenth embodiment of the ultrasonic atomization sheet according to the present invention.
Figure 33:
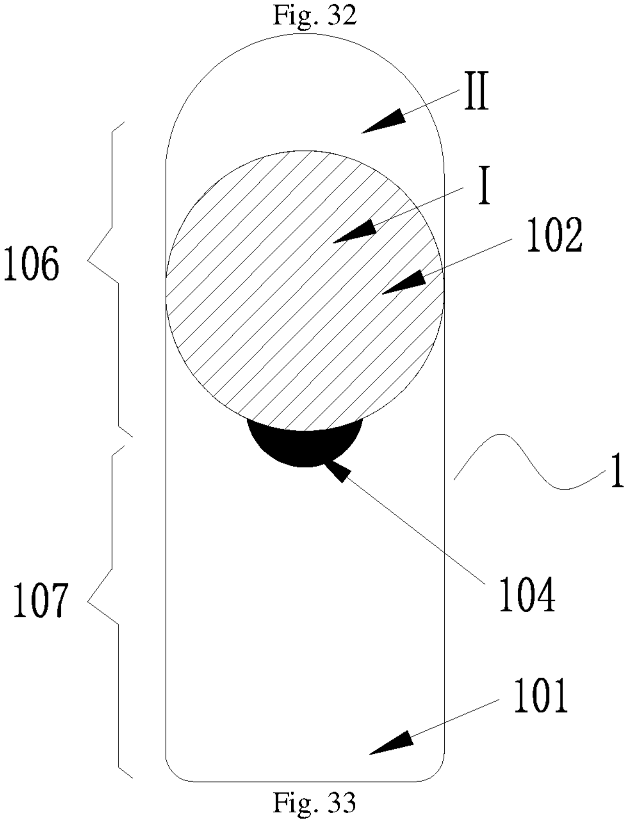
FIG. 33 is a right view of the tenth embodiment of the ultrasonic atomization sheet according to the present invention.
Figure 34:
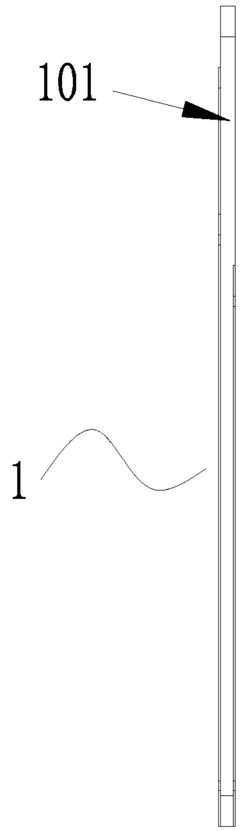
FIG. 34 is a front view of the tenth embodiment of the ultrasonic atomization sheet according to the present invention.

FIGS. 32-34 show a structure of the tenth embodiment of the ultrasonic atomization sheet. The tenth embodiment repeats the eighth embodiment, and the differences lie in that one surface of the oscillating section 106 is composed of an attachment region I fixed with the surface electrode 102 and an exposed region II not fixed with the surface electrode 102, the attachment region I and the exposed region II are arranged along the length direction of the oscillating section 106, and the attachment region I is closer to the fixed section 107 than the exposed region II; and the area ratio of the surface electrode 102 to the drive electrode 103 is 2:1. The surface electrode 102 is provided at a distance from an end of the oscillating section 106, so that the heat generated by the ultrasonic atomization sheet 1 during the atomization process can be diffused to both ends to achieve fast heat dissipation and better atomization effect, the oscillating section 106 is prevented from being broken due to high temperature, and the service life of the ultrasonic atomization sheet 1 is prolonged.

Figure 35:
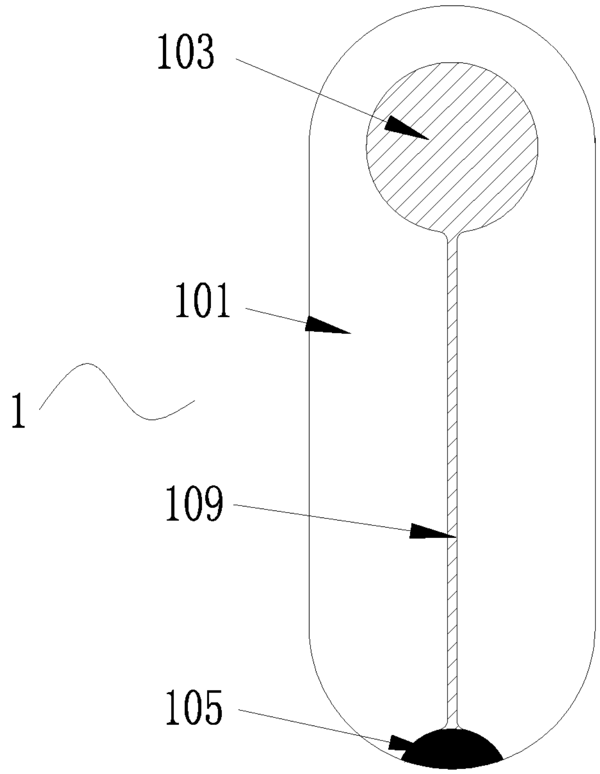
FIG. 35 is a left view of the eleventh embodiment of the ultrasonic atomization sheet according to the present invention.
Figure 36:
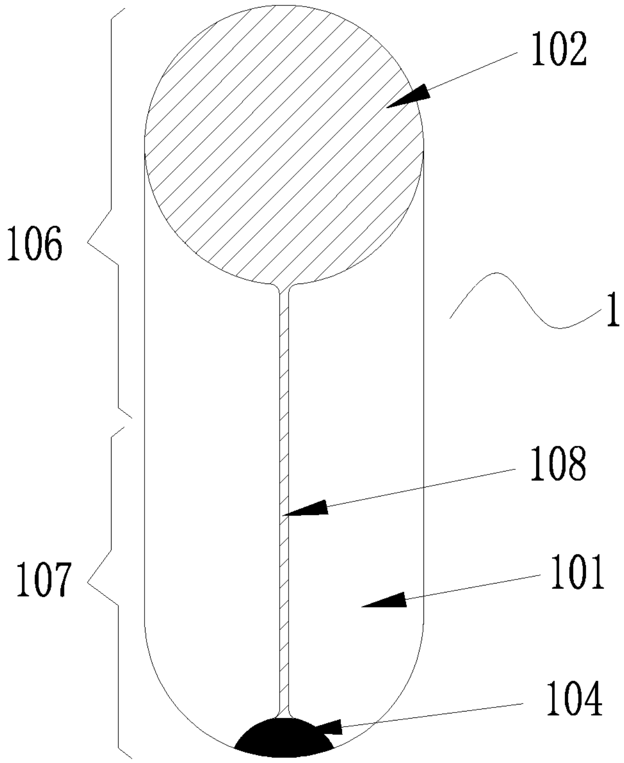
FIG. 36 is a right view of the eleventh embodiment of the ultrasonic atomization sheet according to the present invention.
Figure 37:
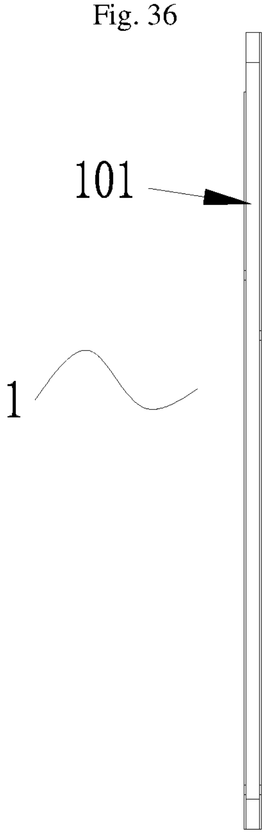
FIG. 37 is a front view of the eleventh embodiment of the ultrasonic atomization sheet according to the present invention.

FIGS. 35-37 show a structure of the eleventh embodiment of the ultrasonic atomization sheet. The eleventh embodiment repeats the seventh embodiment, and the differences lie in that the outer ends of the oscillating section 106 and the fixed section 107 are arc surfaces, and the oscillating section 106 and the fixed section 107 do not need to be specially distinguished when processing, which saves production time and cost.

In another structure of the atomizer of the ultrasonic electronic cigarette (the atomizer of this structure is not shown in the drawings, but does not affect the understanding and implementation of the present invention by those skilled in the art), the atomizer comprises a shell 2, a holder 20 made of silica gel is arranged in the shell 2, the ultrasonic atomization sheet 1 described in the second embodiment is further arranged in the shell 2, and the holder 2 is fixed in a middle region between two side walls of the ultrasonic atomization sheet 1, so that both ends of the ultrasonic atomization sheet 1 are in a free state. The first welding spot 104 and the second welding spot 105 are both arranged at edge positions of the ultrasonic atomization sheet 1 and in a fixed region where the ultrasonic atomization sheet 1 is fixed by the holder 20. The holder 20 is fixed in the middle region between the two side walls of the ultrasonic atomization sheet 1, so the amplitude of the middle region between the two side walls of the ultrasonic atomization sheet 1 is small. Therefore, the first welding spot 104 and the second welding spot 105 are arranged in the middle region with small amplitude between the two side walls of the ultrasonic atomization sheet 1, which prevents the first welding spot 104 and the second welding spot 105 from being pulled off when the ultrasonic atomization sheet 1 performs oscillation, thereby ensuring the reliability of conduction and the working reliability of the ultrasonic atomization sheet 1. In this structure, both ends of the ultrasonic atomization sheet 1 can be in contact with a smoking material and atomize the smoking material to produce smoke, which increases the amount of smoke; and two ends of the ultrasonic atomization sheet 1 can also be in contact with different tastes of smoking materials to meet the requirements for different tastes of smoke.

The embodiments of the present invention are described above with reference to the drawings, but the present invention is not limited to the specific embodiments. The specific embodiments described above are merely illustrative but not restrictive. Many forms may also be made by those of ordinary skill in the art under the enlightenment of the present invention without departing from the purpose of the present invention and the scope of the claims, and these forms fall into the scope of the present invention.

The embodiments of the present invention are described above with reference to the drawings, but the present invention is not limited to the specific embodiments. The specific embodiments described above are merely illustrative but not restrictive. Many forms may also be made by those of ordinary skill in the art under the enlightenment of the present invention without departing from the purpose of the present invention and the scope of the claims, and these forms fall into the scope of the present invention.

The invention claimed is:

1. An ultrasonic atomizer, comprising:
   a shell (2) in which a holder (20) is arranged; and an ultrasonic atomization sheet (1) comprising a flaky piezoelectric substrate (101), a surface electrode (102) attached to one surface of the piezoelectric substrate (101), and a drive electrode (103) attached to another surface of the piezoelectric substrate (101), wherein the piezoelectric substrate (101) is elongated, wherein:
   the ultrasonic atomization sheet (1) is further arranged in the shell (2), and
   the holder (20) is fixed in a middle region between two side walls of the ultrasonic atomization sheet (1), so that both ends of the ultrasonic atomization sheet (1) are in a free state.

2. The ultrasonic atomizer according to claim 1, wherein:
   the piezoelectric substrate (101) is composed of an oscillating section (106) and a fixed section (107) connected to each other,
   the surface electrode (102) is fixed on one surface of the oscillating section (106), and
   the drive electrode (103) is fixed on another surface of the oscillating section (106).

3. The ultrasonic atomizer according to claim 2, wherein,
   the surface electrode (102) and the drive electrode (103) are both rectangular;
   or,
   the surface electrode (102) and the drive electrode (103) are both circular.

4. The ultrasonic atomizer according to claim 1, wherein:
   the one surface of the piezoelectric substrate (101) is fully covered by the surface electrode (102),
   a central region of the other surface of the piezoelectric substrate (101) is covered by the drive electrode (103), and
   an area ratio of the surface electrode (102) to the drive electrode (103) is a:b, where a is larger than b.

5. The ultrasonic atomizer according to claim 3, wherein:
   the one surface of the oscillating section (106) is fully covered by the surface electrode (102),
   a central region of the other surface of the oscillating section (106) is covered by the drive electrode (103), and
   an area ratio of the surface electrode (102) to the drive electrode (103) is a:b, where a is larger than b.

6. The ultrasonic atomizer according to claim 3, wherein:
   the one surface of the oscillating section (106) is composed of an attachment region (I) fixed with the surface electrode (102) and an exposed region (II) not fixed with the surface electrode (102),
   the attachment region (1) and the exposed region (II) are arranged along the length direction of the oscillating section (106), and
   the attachment region (1) is closer to the fixed section (107) than the exposed region (II); and
   an area ratio of the surface electrode (102) to the drive electrode (103) is a:b, where a is larger than b.

7. The ultrasonic atomizer according to claim 1, wherein the piezoelectric substrate (101) is further provided with a first welding spot (104) connected with the surface electrode (102) and a second welding spot (105) connected with the drive electrode (103).

8. The ultrasonic atomizer according to claim 7, wherein:
   the first welding spot (104) is arranged at an outer edge of the surface electrode (102), and
   the second welding spot (105) is arranged at an outer edge of the drive electrode (103).

9. The ultrasonic atomizer according to claim 7, wherein:
   the first welding spot (104) and the second welding spot (105) are both arranged on an outer surface of a fixed section (107),
   a first conductive lead (108) connecting the first welding spot (104) with the surface electrode (102) is fixed on the piezoelectric substrate (101), and
   a second conductive lead (109) connecting the second welding spot (105) with the drive electrode (103) is fixed on the piezoelectric substrate (101).

10. The ultrasonic atomizer according to claim 9, wherein:

a shape of the first conductive lead (108) is an isosceles trapezoid, a large end of the first conductive lead (108) is connected to the surface electrode (102) in a smooth transition manner, and a small end of the first conductive lead (108) is connected to the first welding spot (104) in a smooth transition manner;

a shape of the second conductive lead (109) is an isosceles trapezoid, a large end of the second conductive lead (109) is connected to the drive electrode (103) in a smooth transition manner, and a small end of the second conductive lead (109) is connected to the second welding spot (105) in a smooth transition manner.

11. The ultrasonic atomizer according to claim 2, wherein:

the surface electrode (102) and the drive electrode (103) are both circular; and an outer end of the oscillating section (106) and/or the fixed section (107) is an arc surface.

12. The ultrasonic atomizer according to claim 1, wherein:

an outer edge of the piezoelectric substrate (101) is provided with a first welding spot (104) connected with the surface electrode (102), and the outer edge of the piezoelectric substrate (101) is provided with a second welding spot (105) connected with the drive electrode (103); and the first welding spot (104) and the second welding spot (105) are both arranged at edge positions of the ultrasonic atomization sheet (1) and in a fixed region where the ultrasonic atomization sheet (1) is fixed by the holder (20).

13. The ultrasonic atomizer according to claim 1, wherein:

the piezoelectric substrate (101) is composed of an oscillating section (106) and a fixed section (107) connected to each other, the fixed section (107) of the ultrasonic atomization sheet (1) is fixed by the holder (20), and the oscillating section (106) of the ultrasonic atomization sheet (1) is a free section.

14. An ultrasonic electronic cigarette, comprising an ultrasonic atomizer, wherein the ultrasonic atomizer comprises: a shell (2) in which a holder (20) is arranged; and the ultrasonic atomization sheet (1) comprising a flaky piezoelectric substrate (101), a surface electrode (102) attached to one surface of the piezoelectric substrate (101), and a drive electrode (103) attached to another surface of the piezoelectric substrate (101), wherein the piezoelectric substrate (101) is elongated, wherein:

the ultrasonic atomization sheet (1) is arranged in the shell (2), the piezoelectric substrate (101) is composed of an oscillating section (106) and a fixed section (107) connected to each other, the fixed section (107) of the ultrasonic atomization sheet (1) is fixed by the holder (20), and the oscillating section (106) of the ultrasonic atomization sheet (1) is a free section;

wherein:

an e-liquid guide mechanism (3) and an e-liquid compartment (4) are further arranged in the shell (2), and the e-liquid compartment (4) is communicated with an atomization surface of the ultrasonic atomization sheet (1) through the e-liquid guide mechanism (3).

15. The ultrasonic electronic cigarette according to claim 14, wherein:

a limit plate (5) is arranged in the shell (2), the limit plate (5) is located on one side of the ultrasonic atomization sheet (1), and the e-liquid guide mechanism (3) is located on another side of the ultrasonic atomization sheet (1); and there is a gap (6) between the limit plate (5) and the oscillating section (106) of the ultrasonic atomization sheet (1).

16. The ultrasonic electronic cigarette according to claim 14, wherein:

an outer atomization sleeve (7) and an inner atomization sleeve (8) are arranged in the shell (2), the e-liquid guide mechanism (3) is cup-shaped, a side wall of the e-liquid guide mechanism (3) is sleeved between the outer atomization sleeve (7) and the inner atomization sleeve (8), and an outer bottom surface of the e-liquid guide mechanism (3) is in contact with the atomization surface of the ultrasonic atomization sheet (1).

17. The ultrasonic electronic cigarette according to claim 16, wherein:

a division plate (9) is arranged in the inner atomization sleeve (8), the division plate (9) divides the inner atomization sleeve (8) into a first cavity (10) and a second cavity (11), the first cavity (10) is communicated with the e-liquid compartment (4), and the second cavity (11) is communicated with an inner bottom surface of the e-liquid guide mechanism (3); and a side wall of the inner atomization sleeve (8) corresponding to the first cavity (10) is provided with an e-liquid passing groove (801) communicating the e-liquid compartment (4) with the e-liquid guide mechanism (3).

18. The ultrasonic electronic cigarette according to claim 17, wherein:

a mouthpiece (12) is connected to a top of the shell (2), an air tube (13) is arranged in the shell (2), one end of the air tube (13) is communicated with an air inlet (14), another end of the air tube (13) is communicated with the second cavity (11), and a side wall of the e-liquid guide mechanism (3) is provided with an air passing hole (301) communicating the second cavity (11) with the mouthpiece (12).

19. The ultrasonic electronic cigarette according to claim 14, wherein the length direction of the ultrasonic atomization sheet (1) is parallel to the length direction of the ultrasonic electronic cigarette.

20. An ultrasonic atomization sheet, comprising a flaky piezoelectric substrate (101), a surface electrode (102) attached to one surface of the piezoelectric substrate (101), and a drive electrode (103) attached to another surface of the piezoelectric substrate (101), wherein:

the piezoelectric substrate (101) is elongated, the piezoelectric substrate (101) is composed of an oscillating section (106) and a fixed section (107) connected to each other, the surface electrode (102) is fixed on one surface of the oscillating section (106), the drive electrode (103) is fixed on another surface of the oscillating section (106), the surface electrode (102) and the drive electrode (103) are both rectangular or both circular, the one surface of the oscillating section (106) is composed of an attachment region (I) fixed with the surface electrode (102) and an exposed region (II) not fixed with the surface electrode (102), the attachment region (1) and the exposed region (II) are arranged along the length direction of the oscillating section (106), the attachment region (1) is closer to the fixed section (107) than the exposed region (II); and an area ratio of the surface electrode (102) to the drive electrode (103) is a:b, where a is larger than b.

* * * * *